United States Patent
Preschke et al.

(10) Patent No.: US 8,671,518 B2
(45) Date of Patent: Mar. 18, 2014

(54) RETROFITTABLE ROLLER ELEMENT AND FOOT FOR AN AUTOMATIC STORAGE SYSTEM, AND METHOD FOR DISPLACING AN AUTOMATIC STORAGE SYSTEM

(75) Inventors: Harald Preschke, Vöhringen (DE); Wolfgang Kollmann, Pfaffenhausen (DE)

(73) Assignee: Kardex Produktion Deutschland GmbH, Neuburg/Kammel (DE)

( * ) Notice: Subject to any disclaimer, the term of this patent is extended or adjusted under 35 U.S.C. 154(b) by 452 days.

(21) Appl. No.: 12/889,476

(22) Filed: Sep. 24, 2010

(65) Prior Publication Data
US 2011/0099753 A1    May 5, 2011

(30) Foreign Application Priority Data
Oct. 29, 2009 (DE) .......................... 10 2009 051 191

(51) Int. Cl.
*B60B 33/00* (2006.01)
(52) U.S. Cl.
USPC .................................................. 16/30; 16/32
(58) Field of Classification Search
USPC ....... 16/18 R, 19, 23, 28, 30, 32; 280/47.131, 280/763.1, 764.1, 43.1, 35; 190/18 A
See application file for complete search history.

(56) References Cited

U.S. PATENT DOCUMENTS

| | | | |
|---|---|---|---|
| 3,058,755 A | 10/1962 | Baron | |
| 3,170,708 A | 2/1965 | Miller | |
| 4,422,212 A | 12/1983 | Sheiman et al. | |
| 4,698,875 A | 10/1987 | Kreeger | |
| 5,701,843 A | 12/1997 | Lazides | |
| 6,408,482 B1* | 6/2002 | Henriott et al. | 16/29 |
| 7,159,278 B2* | 1/2007 | Hilger | 16/102 |
| 7,478,819 B1 | 1/2009 | Boraas et al. | |
| 8,136,201 B2* | 3/2012 | Yantis et al. | 16/32 |
| 8,141,885 B2* | 3/2012 | Fan et al. | 280/30 |

(Continued)

FOREIGN PATENT DOCUMENTS

| | | |
|---|---|---|
| BE | 554731 A | 2/1957 |
| DE | 4141130 A1 | 6/1993 |

(Continued)

OTHER PUBLICATIONS

Search Report for German Patent Application No. 10 2009 051 191.1, 4 pages.

*Primary Examiner* — William Miller
(74) *Attorney, Agent, or Firm* — Edell, Shapiro & Finnan LLC

(57) ABSTRACT

The present invention relates to a retrofittable roller element (1) for an automatic storage system, the roller element comprising an adapter plate (2) and a transport roller (3), a foot (10) for the automatic storage system, with the foot standing on a floor (11) in an operative position (B) and being lifted from the floor in a transport position (T), and to a method for displacing an automatic storage system. To be able to displace automatic storage systems in an easy way and at low costs, it is intended according to the invention that the adapter plate (2) comprises a continuous fastening opening (8) for mounting the adapter plate (2) on a foot (10) for the storage system and the foot (10) comprises an abutment (W) for the adapter plate (2), and that a force for lifting the foot (10) is introduced into said foot.

22 Claims, 2 Drawing Sheets

(56) References Cited

U.S. PATENT DOCUMENTS

| | | |
|---|---|---|
| 2002/0174512 A1 | 11/2002 | Sorensen |
| 2003/0121740 A1 | 7/2003 | Cheng |
| 2006/0103092 A1 | 5/2006 | Strahler et al. |

FOREIGN PATENT DOCUMENTS

| | | |
|---|---|---|
| DE | 10260134 A1 | 7/2004 |
| DE | 202004014452 U1 | 11/2004 |
| DE | 20023642 U1 | 4/2005 |
| DE | 202006012561 U1 | 11/2006 |
| GB | 1582915 A | 1/1981 |
| JP | 60022407 U | 2/1985 |
| JP | 63107311 U | 7/1988 |
| JP | 08324729 A | 12/1996 |
| JP | 09181459 A * | 7/1997 |
| JP | 9181459 A | 7/1997 |

* cited by examiner

RETROFITTABLE ROLLER ELEMENT AND FOOT FOR AN AUTOMATIC STORAGE SYSTEM, AND METHOD FOR DISPLACING AN AUTOMATIC STORAGE SYSTEM

FIELD OF THE INVENTION

The present invention relates to a retrofittable roller element for an automatic storage system, such as a paternoster or a storage lift, the roller element comprising a transport roller and an adapter plate to which the transport roller is captively connected. Furthermore, the present invention relates to a foot for an automatic storage lift system, such as a paternoster or a storage lift, with the foot comprising a roller element with an adapter plate to which a transport roller is captively connected, and the foot being transferable from an operative position, in which it stands on a floor, into a transport position, in which it is lifted from the floor and the transport roller is placed on the floor. Furthermore, the present invention relates to a method for displacing an automatic storage system, such as a paternoster or a storage lift, in which at least a foot of the storage system is transferred from an operative position, in which it stands on the floor, into a transport position, in which it is lifted from the floor and a transport roller is placed on the floor.

BACKGROUND OF THE INVENTION

Roller elements for automatic storage systems are generally known and are often used for displacing storage systems. To this end the roller elements are mounted on the storage system, and the roller elements may here e.g. be welded, i.e. undetachably mounted, to the storage system, or may also be screwed thereto to be repeatedly detachable. Apart from fastening members through which the roller element is fastened to the storage system, known roller elements further comprise an adjusting member by which the storage system can be moved relative to the roller element and lifted from the floor.

DE 102 601 34 B4 shows such a roller element that is screwed via fastening members, configured as threaded bolts, with a transverse carrier of the storage system. The force for lifting the storage lift is thus introduced into the transverse carrier. The adjusting means is configured as a vertical threaded bolt which is screwed through the transverse carrier and presses against a horizontal plate of the roller element.

When the vertical threaded bolt is screwed by a predetermined amount through the transverse carrier, the storage system is lifted from the floor. The weight of the storage system is here passed from the transverse carrier via the threaded bolts and through a stiffening element in the form of an angle bracket to the horizontal plate and to a transport roller fastened to said plate.

The configuration of said roller element, which is exclusively used for moving the storage system and does otherwise not contribute anything to the function of the storage system, is however unnecessarily complicated and openings for the threaded bolts must at least be provided in the transverse carrier. This increases the purchase costs for the roller element and makes it more difficult to handle the same.

SUMMARY OF THE INVENTION

It is therefore the object of the present invention to provide a device and a method with which automatic storage systems can be displaced easily and at low costs.

As for the above-mentioned retrofittable roller element, this object is achieved in that the adapter plate at its fastening end opposite to the transport roller comprises a continuous fastening opening extending perpendicular to the adapter plate, for mounting the adapter plate on a foot of the storage system. As for the above-mentioned foot for an automatic storage system, this object is achieved in that the foot comprises an abutment for the adapter plate. As for the above-mentioned method, the object is achieved in that a force for lifting the foot is introduced into said foot.

Owing to the simple construction of the roller element, said element can be produced at low costs and can be handled easily and also mounted to be repeatedly detachable. It can be used without difficulty with different automatic storage systems, which may also comprise vertical lift modules, horizontal or vertical carousels, and there is no need for adapting these different storage systems in a complicated way.

The solution according to the invention can be further improved by various configurations that are each advantageous per se and can be combined with one another in any desired way. These embodiments and their associated advantages are discussed hereinafter while the constructional measures and their effects are just described by way of example only for one roller element and one foot, respectively. Of course, the automatic storage system can be moved with the help of a plurality of roller elements or feet according to the invention.

In a particularly advantageous embodiment, the roller element may consist of the adapter plate and of the transport roller captively connected to the plate. This simple structure of the transport roller turns out to be surprisingly easy and viable in practice even if it is used with large or heavy storage systems.

The adapter plate can consist of a metal, such as steel, and can be made solid. Even a roller element with a solid adapter plate is more lightweight than the prior-art roller elements because the roller element according to the invention has a considerably smaller number of parts. Alternatively, the adapter plate may be made from a support structure with e.g. truss-like reinforcement struts or it may be made of plastics or composite materials, whereby its weight is further reduced and its handling is improved. In particular, the adapter plate may be formed as a horizontal carrier that withstands the weight of the storage system.

The adapter plate may rest on the abutment to be pivotable about a pivot axis extending in parallel with the substantially horizontally oriented abutment. Specifically, in a support portion in which the adapter plate rests on the abutment, said adapter plate can form, together with said abutment, a support for a lifting device comprising the roller element, with which lifting device a leverage can be produced and introduced into the foot. Additional parts for mounting the adapter plate on the foot and for introducing lifting forces into the foot are not needed; the foot need not be adapted any further.

There may be provided an adjusting member that can be accommodated through the fastening opening and can be fixed to the abutment to project through the fastening opening. The adjusting member which is immovable relative to the abutment and thus also relative to the storage lift system serves as a stop element on which the adapter plate with its fastening opening can rest in a mounted position of the roller element, whereby the position of the roller element relative to the foot is predetermined.

The adapter plate can be arranged between the abutment and a press-on element in a preassembly position of the roller element abutting on the adjusting member, where the press-on element can be displaceably mounted on the adjusting member and can rest in a pressure portion of the adapter plate spaced apart from the fastening end.

When the press-on element is shifted towards the abutment, it exerts a force on the pressure portion, which force is converted by the adapter plate resting in the support into a pivot leverage force. The section of the adapter plate situated between the pressure portion and the support thereby forms a force arm, and the section of the adapter plate arranged between the transport roller and the support forms a load arm of a pivot lever. The load arm and the force arm of the adapter plate, which is formed as a pivot lever, overlay each other because the rotation point of the pivot lever which coincides with the support and the pivot axis is arranged on an edge of the fastening end that is oriented away from the transport roller.

The pivot position of the adapter plate is variable by shifting the press-on element on the adjusting member. When the press-on element is shifted towards the abutment, the adapter plate will pivot about the pivot axis in the direction towards the abutment because it is pressed by the press-on element into this direction. If both the foot and the transport roller are standing on the floor and if the press-on element is shifted towards the abutment, thereby exerting a force on the adapter plate, the pivot lever-like configuration of the adapter plate, which together with the adjusting member and the press-on element forms the lever device, causes that the foot is lifted from the floor. The weight of the storage system that has so far been introduced by the foot into the floor is now passed through the adapter plate and the transport roller into the floor.

In the transport position the adapter plate can be arranged in parallel with the abutment and may e.g. be pressed together with the same by the press-on element. The adapter plate can here rest on the abutment or it may be pressed onto a bottom side of the abutment oriented towards the floor. Alternatively, the adapter plate can also be pressed with a counter-pressure element which can be arranged, for instance undisplaceably, on the adjusting member.

A foot of a particularly simple structure will be obtained when the adjusting member with the abutment forms a height adjusting member for the storage system. Components are thereby saved again.

To be able to mount the roller element as easily as possible, the fastening section of the roller element may be configured to be pushable onto the adjusting member. To this end the fastening opening may be slit-shaped and shaped with an end open towards the fastening end. Hence, the adapter plate can be pushed in a horizontal direction onto the adjusting member even if an upper end of the adjusting member is only inadequately accessible. If there is the risk that the adapter plate might slip from the adjusting member, the fastening opening may be shaped to be pluggable onto the adjusting member, e.g. as an all around closed elongated hole. Both the slit and the elongated hole can extend in a preassembly position, in which the roller element rests on the foot, in parallel with the adjusting member or vertically aligned continuously through the adapter plate. The slit or the elongated hole can extend with its long axis from the fastening end towards the transport roller. The roller element can be connectable to the foot both with a slit and with an elongated hole to be repeatedly detachable.

To be able to move the storage system in different directions, the transport roller can be connected to the adapter plate to be rotatable about a rotational axis and the transport roller or its rotational axis, respectively, can be connected to the adapter plate to be pivotable about a steering axis extending perpendicular to the rotational axis. Hence, the rotational axis can be easily oriented perpendicular to the direction of movement of the storage system.

If the rotational axis and the steering axis are spaced apart from each other, the orientation of the transport roller, which is now made self-steering, can automatically be adapted to the direction of movement of the storage system. However, a pivoting of such a transport roller will cause a displacement of the storage system. Consequently, particularly in the case of large or heavy storage systems, it can be extremely difficult to align the transport rollers. To permit an easy aligning of the rotational axis with the direction of movement, without a pivotal movement of the transport roller causing a displacement of the storage system, the rotational axis may intersect the steering axis. The intersection point of the two axes may particularly be located in the interior of the transport roller.

Components that are often already parts of a known foot can be further used or replaced by compatible parts, whereby the complexity of the foot according to the invention is kept low. For instance, the abutment may be configured as a substantially horizontally extending carrier plate or a substantially horizontally extending extension arm of the foot, the adjusting member may be formed as a threaded rod which is screwed through the carrier plate and which is part of a support element that comprises the placement area of the foot, and the press-on element may be configured as a counter-nut screwed onto the support element.

At least the components adjusting member and press-on element can be combined together with the roller element as a retrofit kit for existing storage systems. The adjusting member can here be fixed to the storage system and accommodated in the fastening opening. The press-on element may be movable along the adjusting member and mountable on the adjusting member to be brought into abutment with the adapter plate. For instance, the adjusting member can be shaped such that it can be screwed with the storage system and particularly with the abutment, and the press-on element can be formed such that it can be screwed onto the adjusting member.

The invention shall now be explained by way of example on the basis of embodiments with reference to the drawings. The different features of the embodiments can here be combined independently of one another, as has already been outlined in the case of the individual advantageous configurations.

DESCRIPTION

Structure and function of a roller element according to the invention are first of all described with reference to the embodiment of FIG. 1.

Figure 1:
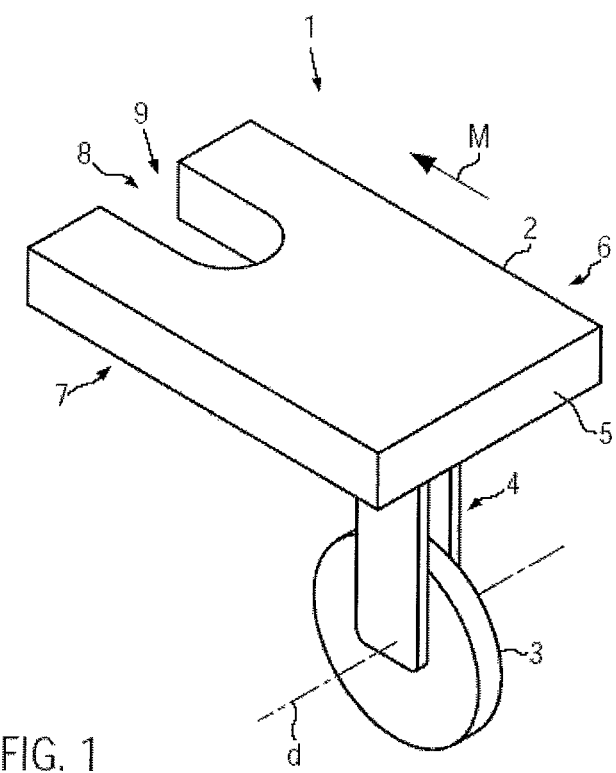
FIG. 1 is a schematic illustration of an embodiment of a roller element according to the invention.

FIG. 1 shows a roller element 1 comprising an adapter plate 2 and a transport roller 3. A roller holder 4 captively connects the transport roller 3 to a roller section 6 of the adapter plate 2, with the roller section 6 being arranged next to an edge portion 5 of the adapter plate 2. The transport roller 3 is rotatably connected to the roller holder 4 about a rotational axis d extending in parallel with the adapter plate 2.

A fastening end 7 of the adapter plate 2 which is opposite to the edge portion 5 and the roller section 6, respectively, is provided with a fastening opening 8 for mounting the roller element 1 on a foot for an automatic storage system. The fastening opening 8 extends substantially in parallel with the roller holder 4 and along a mounting direction M of the roller element 1 through the adapter plate 2 and is shown with an open end 9 facing away from the roller section 6.

In mounting direction M, the roller element 1 can be horizontally pushed onto a vertical connection element of the foot. To limit the movability of the roller element 1, particularly in a direction opposite to the horizontal mounting direction M, and thus to prevent the roller element 1 from slipping from the foot, the fastening opening 8 may have the shape of an elongated hole instead of the slit shape. The adapter plate 2 shaped in this way can be mounted on the foot in a vertical direction also in a repeatedly detachable way. The elongated hole, the long axis of which can preferably point from the fastening end 7 towards the transport roller 3, facilitates the placing operation because it prevents a jamming of the fastening opening 8 with the foot and ensures the necessary minimum degree of movability of the roller element 1 without the stability of the connection between adapter plate 2 and foot being impaired. If the fastening opening 8 is configured as an elongated hole, the roller element 1 is connectable in a self-holding way to the foot. However, a slit-shaped fastening opening 8 facilitates the assembly and disassembly of the roller element 1 because the roller element can thereby be slid just laterally onto the foot.

The adapter plate 2 is shown massive or solid and made from a metal, such as steel or aluminum. To reduce the weight of the roller element 1, the adapter plate 2 may alternatively comprise plastic or composite constituents and may not be solid at least in sections, but may be formed with a support structure, for instance with truss-like struts. Moreover, the adapter plate 2 that extends along a plane may be curved at least in sections so as to be able to distribute e.g. the weight of the storage system in a different way.

The transport roller 3 and/or the roller holder 4 are pivotably fastened to the adapter plate 2 about a steering axis r extending in vertical direction relative to the adapter plate 2 and intersecting the rotational axis d, so that the transport roller 3 can be aligned in parallel with a movement direction in which the storage system is to be displaced.

The roller element 1 may be embodied as a part of a retrofit kit for an automatic storage system or as a functional member pertaining to the storage system. Especially in cases where the fastening opening 8 is slit-shaped, the roller element 1 can be easily pushed as a retrofit member onto a foot formed in almost any desired way; here, the foot must just comprise a vertical connection element, or a section of the foot must be useable as such a connection element. Alternatively, the vertical connection element may be retrofittable.

Figure 2:
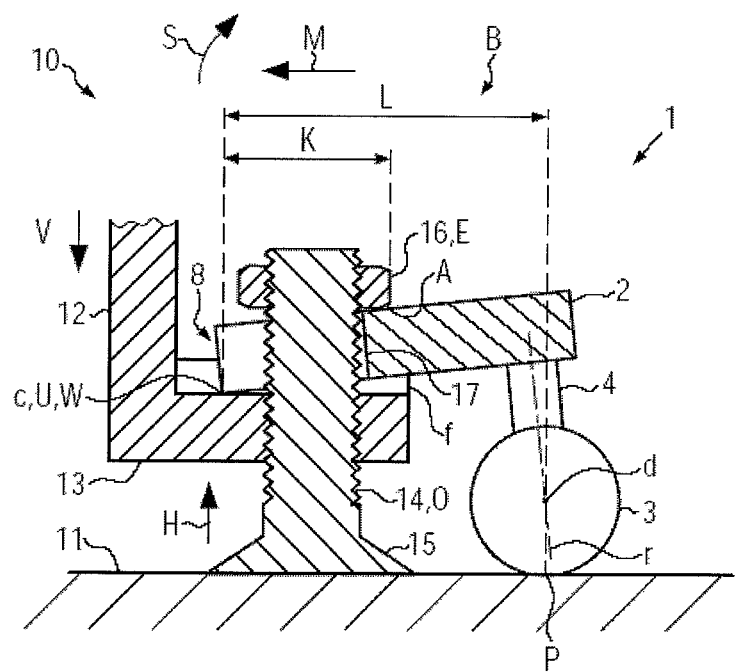
FIG. 2 is a schematic sectional view of an embodiment of a foot according to the invention for an automatic storage system with a roller element in an operative position.

FIG. 2 shows an embodiment of a foot according to the invention for an automatic storage system with a roller element 1 of FIG. 1, the foot being shown in a cut form along a plane extending approximately centrally through the roller element 1 in mounting direction M. Identical reference signs are used for elements that conform in function and/or structure to the elements of the embodiment of FIG. 1. For the sake of conciseness, only the differences with respect to the embodiment of FIG. 1 shall be discussed.

FIG. 2 shows a foot 10 for a storage system with the roller element 1 in an operative position B, in which the foot 10 stands on a floor 11, for instance on a floor of a storehouse. The foot 10 comprises a vertical carrier 12, which is or can be fastened to the storage system (not shown), and a protruding carrier plate 13 which is aligned substantially in horizontal direction and is fastened to the vertical carrier 12 to be aligned in vertical direction thereto.

An adjusting member O in the form of a support element 14 is screwed through the carrier plate 13 shaped in the form of an extension arm, with the foot 10 standing on the floor 11 via the placement end 15 of the support element 14. The weight of the storage lift is introduced in the illustrated operative position B via the vertical carrier 12 and the carrier plate 13 into the support element 14 and its placement end 15 and finally into the floor 11.

The support element 14 projects through the carrier plate 14 while facing away from the floor 11. On a free end of the support element 14 which is oriented away from the floor 11 and is formed at least in sections as a threaded rod, a press-on element E in the form of a screw nut 16 is screwed thereonto in a displacement or press-on direction V oriented towards the carrier plate 13.

The roller element 1 is pushed in the illustrated preassembly position onto the foot 10 in such a way that a stop surface 17 which defines the fastening opening 8 rests on the support element 14 between the carrier plate 13 and the screw nut 16. At least the section of the adjusting member O that rests on the adapter plate 2 fulfills the function of the vertical connection element.

The roller element 1 is here located on the one hand in a contact point P with the transport roller 3 on the floor 11 and on the other hand in a support point U with the fastening end 7 of the adapter plate 2 on the carrier plate 13. Thus the carrier plate 13 forms an abutment W for the adapter plate 2.

Since the roller holder 4 together with the transport roller 3 is made longer than the section of the support element 14 arranged between the floor 11 and the carrier plate 13, the adapter plate 2 extends, when viewed from the support point U, such that it is oriented away from the floor 11 or oblique to the carrier plate 13.

When the screw nut 16 is further screwed in the displacement or press-on direction V onto the support element 14, it will rest between the stop surface 17 and the contact point P in a press-on point A on the adapter plate 2. When the screw nut 16 is now even further screwed onto the support element 14, a lifting force directed onto the floor will thereby be introduced into the press-on point A. Due to the arrangement of the adapter plate 2 extending in a direction oblique to the carrier plate 13, and due to the fact that the roller element 1 rests on the carrier plate 13 only in the support point U, the lifting force is converted into a leverage force that counteracts the weight of the storage system and is operative via a force arm K of the adapter plate. The force arm K is formed by a section of the adapter plate 2 that extends between the press-on point A and the support point U.

To complete the lever-like form of the roller element 1, the section of the adapter plate 2 which extends between the support point U and the contact point P is shaped as a load arm L. The force arm K and the load arm L are here overlapping each other at least in sections.

With a further displacement of the screw nut 16 towards the floor 11 or towards the carrier plate 13, the roller element 1 will pivot around the contact point P in a pivot direction S which is opposite to the press-on direction V and oriented away from the floor 11. The foot 10 is being lifted from the floor 11 in a lifting direction H oriented away from the floor 11.

The carrier plate 13 serves particularly in the area of the support point U as an abutment or rest W for the adapter plate 2, with a pivot lever axis c of the adapter plate 2, which is shaped in the manner of a pivot lever, extending in parallel with the abutment W. When the foot 10 is lifted, the roller element 1 is pivoted about the pivot lever axis c relative to the carrier plate 13.

To prevent a horizontal twisting of the roller element 1 relative to the carrier plate 13 when the foot 10 is lifted, or during a shifting process of the storage system, the carrier plate 13 has secured to it an optional guide wall f against which the adapter plate 2 abuts during movements around the support element 14.

Apart from the roller element 1, the retrofit kit may also comprise an adjusting member O which can be fastened to the carrier plate 13, e.g. a threaded rod, or the support element 14, which may be made longer than a support element provided in the standard way, and the screw nut 16.

Figure 3:
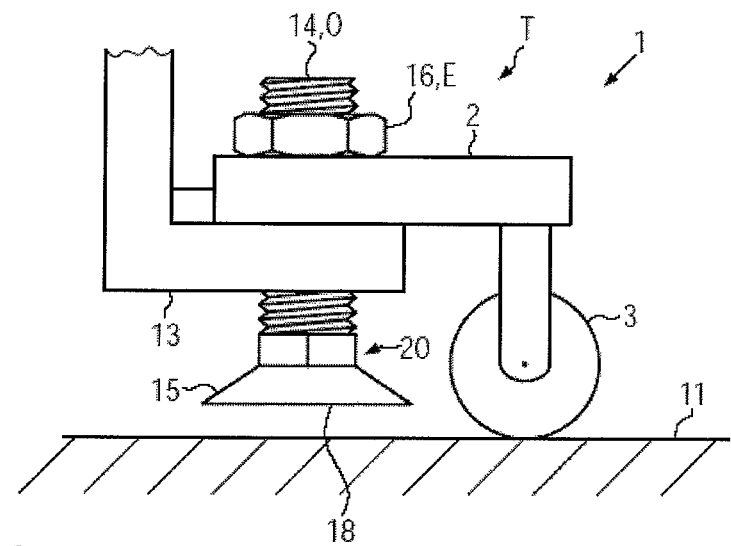
FIG. 3 shows the embodiment of FIG. 2 in a side view, with the foot being shown in a transport position.

FIG. 3 shows the embodiment of FIG. 2 in the side view of FIG. 2, but in uncut form and in a transport position T in which the placement end 15 is lifted from the floor 11.

The adapter plate 2 is pivoted in transport position T further towards the carrier plate 13. The extension of the slit-shaped fastening opening 8 away from the fastening end 7, with the fastening opening 8 being optionally also formed as an elongated hole with the same orientation, makes it possible to pivot the adapter plate 2 relative to the vertically directed adjusting member O. The screw nut 16 is screwed onto the support element 14 to such an extent that it presses the adapter plate 2 with the carrier plate 13 in a repeatedly detachable way, with the adapter plate 2 touching the carrier plate 13. A placement area 18 of the placement end 15 is lifted from the floor 11. The weight of the storage system is introduced from the carrier plate 13 to the adapter plate 2 and from there via the transport roller 3 into the floor 11. The screw nut 16 as a counter nut protects against unintended rotation of the support element 14.

It can clearly be seen in this view that the support element 14 is formed between the placement end 15 and a threaded section 19 with an operation section 20. When the counter nut 16 is released, the support element 14 can be rotated with the help of a tool, for instance a jaw wrench, put on the operation section 20, whereby the installation height of the storage system is variable. Thus the support element 14 forms a height adjusting means for the foot 10 together with the carrier plate 13.

In the embodiment as is here shown, the adapter plate 2 rests on an upper side of the carrier plate 13 facing away from the floor 11. Alternatively, the adapter plate 2 can also be pressed against the bottom side of the carrier plate 13 oriented towards the floor 11; in this instance, the screw nut 16 would then have to be arranged between the placement end 15 and the adapter plate 2. Moreover, at least one spacer element, e.g. a further screw nut screwed onto the support element 14, can be provided between the adapter plate 2 and the carrier plate 13.

The invention claimed is:

1. A retrofittable roller element (1) for an automatic storage lift system comprising a transport roller (3) and an adapter plate (2) to which the transport roller (3) is captively connected, wherein the adapter plate (2) at its fastening end (7) opposite to the transport roller (3) comprises a continuous fastening opening (8) extending perpendicular to the adapter plate (2), for mounting the adapter plate (2) on a foot (10) for the storage system, an adjusting member (O) which is fixable to the storage system and receivable in the fastening opening (8), and a press-on element (E) which is movable along the adjusting member (O) and mountable on the adjusting member (O) to be brought into abutment on the adapter plate (2), wherein the fastening opening (8) is shaped in the form of a slit and open towards the fastening end (7).

2. The roller element (1) according to claim 1, characterized in that the adjusting member (O) comprises a threaded section (19), and the press-on element (E) is formed as a screw nut (16).

3. The roller element (1) according to claim 1, characterized in that the adjusting member (O) forms a placement area (18) of the foot (10) for the storage system.

4. The roller element (1) according to claim 1, characterized in that the transport roller (3) is connected to the adapter plate (2) to be rotatable about a rotational axis (d) and to be pivotable about a steering axis (r) extending perpendicular to the rotational axis (d).

5. The roller element (1) according to claim 4, characterized in that the rotational axis (d) intersects the steering axis (r).

6. The roller element (1) according to claim 1, wherein the foot (10) that the roller element (1) is mounted to is transferable from an operative position (B), in which the foot (10) stands on a floor (11), to a transport position (T), in which the foot (10) is lifted from the floor (11) and the transport roller (3) bears on the floor (11), characterized in that the foot (10) comprises an abutment (W) for the adapter plate (2).

7. The roller element (1) according to claim 6, wherein when the foot (10) is at least in the operative position (B) the adapter plate (2) rests on the abutment (W) to be pivotable about a pivot axis (c) extending in parallel with the abutment (W).

8. The roller element (1) according to claim 6, wherein when the foot (10) is in the operative position (B) the adapter plate (2) extends inclined relative to the abutment (W) and in the transport position (T), in comparison with the operative position (B), it is pivoted towards the abutment (W).

9. The roller element (1) according to claim 1, wherein the adapter plate (2) comprises an edge portion (5) opposite that of the fastening end (7), and a roller section (6) disposed next to the edge portion (5) of the adapter plate (2).

10. The roller element (1) according to claim 9, further comprising:
a roller holder (4) coupling the transport roller (3) to the roller section (6) of the adapter plate (2).

11. The roller element (1) according to claim 1, characterized in that a pivot position of the adapter plate (2) is changeable by displacing the press-on element (E) on the adjusting member (O).

12. A foot (10) for an automatic storage lift system, the foot (10) having a roller element (1) with an adapter plate (2) to which a transport roller (3) is captively connected, and the foot (10) being transferable from an operative position (B), in which it stands on a floor (11), into a transport position (T), in which it is lifted from the floor (11) and the transport roller (3) bears on the floor (11), wherein the foot (10) comprises an abutment (W) for the adapter plate (2), and at least in the operative position (B) the adapter plate (2) rests on the abutment (W) to be pivotable about a pivot axis (c) extending in parallel with the abutment (W).

13. The foot (10) according to claim 12, characterized in that in the operative position (B) the adapter plate (2) extends inclined relative to the abutment (W) and in the transport position (T), in comparison with the operative position (B), it is pivoted towards the abutment (W).

14. The foot (10) according to claim 12, characterized in that the roller element (1) is shaped so the adapter plate (2) at a fastening end (7) opposite to the transport roller (3) comprises a continuous fastening opening (8) extending perpendicular to the adapter plate (2), for mounting the adapter plate (2) on the foot (10) for the storage system, an adjusting member (O) which is fixable to the storage system and receivable in the fastening opening (8), the adjusting member (O) forming a placement area (18) of the foot (10) for the storage system, and a press-on element (E) which is movable along the adjusting member (O) and mountable on the adjusting member (O) to be brought into abutment on the adapter plate (2), wherein the fastening opening (8) is shaped in the form of a slit and open towards the fastening end (7).

15. The foot (10) according to claim 14, characterized in that the adjusting member (O) is fixed to the abutment (W) while projecting through the fastening opening (8), and the adapter plate (2) is arranged at least in the area of the fastening opening (8) between the abutment (W) and the press-on element (E).

16. The foot (10) according to claim 14, characterized in that a pivot position of the adapter plate (2) is changeable by displacing the press-on element (E) on the adjusting member (O).

17. The foot (10) according to claim 14, characterized in that the adjusting member (O) with the abutment (W) forms a height adjusting member of the foot (10).

18. The foot (10) according to claim 14, characterized in that the abutment (W) is configured as a carrier plate (13) of the foot (10) extending substantially in horizontal direction, the adjusting member (O) is configured as a support element (14) which is screwed through the carrier plate (13) and which comprises the placement area (18) of the foot (10), and the press-on element (E) is configured as a counter nut (16) screwed onto the support element (14).

19. The foot (10) according to claim 14, characterized in that the adjusting member (O) comprises a threaded section (19), and the press-on element (E) is formed as a screw nut (16).

20. The foot (10) according to claim 14, characterized in that the transport roller (3) is connected to the adapter plate (2) to be rotatable about a rotational axis (d) and to be pivotable about a steering axis (r) extending perpendicular to the rotational axis (d).

21. The foot (10) according to claim 20, characterized in that the rotational axis (d) intersects the steering axis (r).

22. A method of displacing the automatic storage lift system according to claim 12, in which at least the foot (10) of the storage system is transferred from the operative position (B), in which it stands on the floor (11), into the transport position (T), in which it is lifted from the floor (11) and the transport roller (3) is placed on the floor (11), characterized in that a force for lifting the foot (10) is introduced into said foot (10).

* * * * *